United States Patent [19]
Griggs

[11] 3,959,886
[45] June 1, 1976

[54] CLASSIFICATION GAUGE FOR VANE CLUSTERS

[76] Inventor: Elmer L. Griggs, 1720 Toledo, Burlingame, Calif. 94010

[22] Filed: May 8, 1975

[21] Appl. No.: 575,501

[52] U.S. Cl............................. 33/174 C; 33/174 PA
[51] Int. Cl.².................................... G01B 5/20
[58] Field of Search..................... 33/174 C, 174 PA

[56] References Cited
UNITED STATES PATENTS

| | | | |
|---|---|---|---|
| 3,464,119 | 9/1969 | Griggs | 33/174 C |
| 3,678,585 | 7/1972 | Dabrush et al. | 33/174 C |
| 3,757,424 | 9/1973 | Palmenberg | 33/174 C |
| 3,832,784 | 9/1974 | Samuels et al. | 33/174 C |

Primary Examiner—Richard E. Aegerter
Assistant Examiner—Richard R. Stearns
Attorney, Agent, or Firm—Robert Charles Hill

[57] ABSTRACT

A classification gauge for classifying vane clusters to provide a known throat area including a plurality of airfoil-like elements, the gauge including a precision jig for positioning the vane cluster, movable probe means for determining the angular alignment of each airfoil element and linkage means for connecting the respective movable probes with a classifying dial.

15 Claims, 6 Drawing Figures

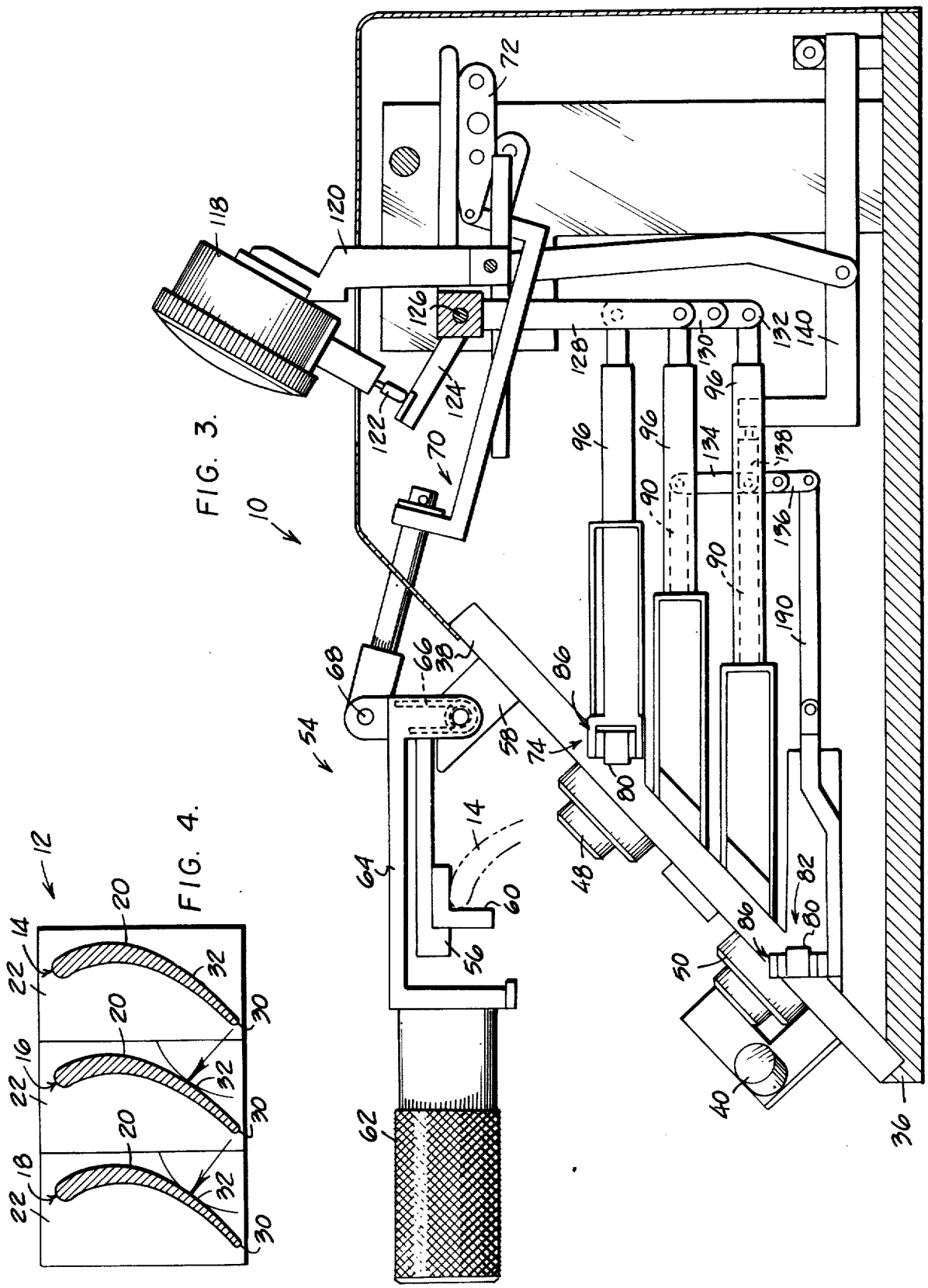

3,959,886

CLASSIFICATION GAUGE FOR VANE CLUSTERS

BACKGROUND OF THE INVENTION

The present invention relates to a classification gauge generally of a type disclosed in prior U.S. Pat. No. 3,464,119, issued Sept. 2, 1969 to the inventor of the present classification gauge. The classification gauge of the present invention, like the earlier classification gauge, relates to the determination of a relative effective open area in the various stages of turbojet engines. The classification gauge of the present invention is particularly directed toward such determinations in connection with vane clusters including a plurality of guide vanes, turbine blades and/or other similar structures.

Substantial background information is set forth by the above-noted patent and is not included herein since it is not believed essential to an understanding of the present invention. Generally, it is believed sufficient to understand that a certain effective open area between adjacent guide vanes for permitting the passage of gas therethrough, commonly referred to as "throat area", must be maintained or at least known with precision. The known throat area of a turbojet engine is the desired open area required to allow the engine to perform properly. As was discussed in substantial detail within the above-noted patent, the total open area or throat area in each row of guide vanes is very important. In an average size turbojet engine, it must not vary more than approximately 1 square inch from the determined parameters. If the area is too small, "choke-off" may occur and the desired quantity of fluid or gas cannot pass through that stage.

The throat area of a vane cluster can change during use because of distortions caused by heat, the force of the gases passing therethrough and erosion due to use. Accordingly, it may be necessary to monitor the effective throat area during use as well as upon initial assembly.

The classification gauge described by the above-noted patent is particularly adapted to determine the effective throat area and therefore the proper classification for individual guide vanes. That prior classification gauge functions generally to accurately position a trailing edge of the airfoil within a precision jig and then to arrange a spaced-apart portion of the airfoil in a position determined by other parameters including the efffective total length for the guide vane. In this manner, the guide vane is accurately positioned in an angular arrangement with an indicating guide then being effective to measure the relative angular position of a mounting flange for the guide vane.

The present classification gauge for vane clusters performs a generally similar function in connection with a plurality of such guide vanes or airfoils secured together in a fixed relationship suitable for mounting in a turbojet engine stage, for example.

The term "classification" as employed here refers to an arbitrary system used, for example, by airplane engine manufacturers for constructing or selecting the proper throat area for a particular stage of a turbojet engine. Each classification "number" represents a specific throat area.

SUMMARY OF THE INVENTION

Accordingly, it is an object of the present invention to provide a new and improved classification gauge for vane clusters and fixed arrangements of other similar elements.

It is also an object of the invention to provide a precision classification gauge for receiving such a vane cluster and classifying the angular arrangement of a plurality of airfoil elements relative to their mounting means.

It is also an object of the invention to provide a precision classification gauge wherein a vane cluster or airfoil element is supported in fixed relation by a platform engaging mounting flange surfaces thereof, a classification indicator being responsive to movable contacts precisely correlating guide vane angle and length for accurately determining the proper classification.

Additional objects and advantages of the invention are made apparent in the following description having reference to the accompanying drawings.

BRIEF DESCRIPTION OF THE DRAWINGS

FIG. 3 is a view, with parts in section, taken from the right side of FIG. 2.

FIG. 4 is a centrally sectioned view of the vane cluster including a plurality of airfoil sections.

DESCRIPTION OF THE PREFERRED EMBODIMENT

Figure 1:
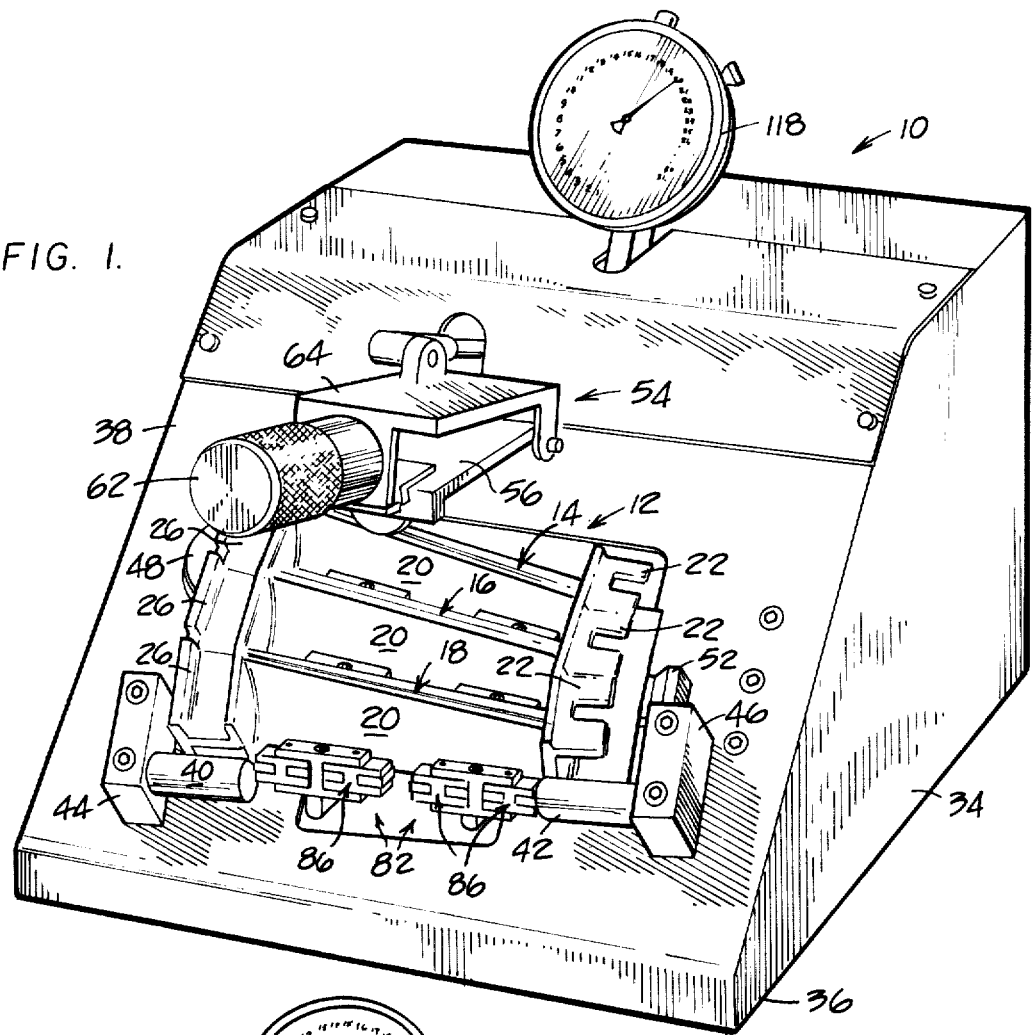
FIG. 1 is a perspective view of a classifying gauge according to the present invention with a vane cluster being arranged within a precision jig for the gauge.

As was also indicated above, the present invention gauge for airfoil elements or vane clusters has a similar purpose as the classification gauge described in the prior U.S. Patent noted above. The classification gauge of the prior patent employed two sets of movable probes to engage various portions of a guide vane and thereby secure the guide vane in angular alignment within a precision jig. The movable probes for that classification gauge also took into account the effective length of the guide vane. The angular position for the hub mounting flange of the guide vane was then measured and indicated by a suitable indicating gauge enabling one to readily determine the classification for the guide vane.

The present classification gauge similarly includes a mechanical averaging linkage coupled with a large number of movable probes. However, information established by the movable probes could also be collected hydraulically, electrically or by computer means or any other system capable of producing an average reading generally in the manner described below.

The classification gauge of the present invention also similarly measures the length and width of the open area or throat area for a single airfoil element or more preferably for a vane cluster including a plurality of such airfoil elements arranged in fixed relation by interconnection of their mounting flanges.

It is to be understood that the terms "open area" or throat area refer generally to the effective maximum area of opening between an adjacent pair of guide vanes or airfoils. Naturally, such openings are not readily available for complete measurement when classification is being determined selectively for one or a limited number of airfoil elements secured together within a vane cluster. However, within the terms of the present invention, the effective open or throat area can be determined even though there is an incomplete arrangement of adjacent guide vanes. For example, if a classification number is determined on an arbitrary but repeatable basis for each individual airfoil element, a plurality of such elements having selected classification numbers may be combined to achieve a predetermined classification or total open area for an entire circumferential arrangement of airfoil elements.

The present invention is particularly contemplated for determining the classification of a vane cluster including three guide vanes or airfoil elements. Here again, the number of airfoil elements within the vane cluster is arbitrary and the present classification gauge could as readily be adapted to classify vane clusters including, for example, two or four airfoil elements. However, for a vane cluster of three airfoil elements, it is contemplated that approximately 102 separate contact points are established on each vane cluster in order to provide 102 separate pieces of information which are then mechanically integrated into one reading or classification number.

In addition, to the approximate 102 contact points noted above, it is also important to provide a platform which assures accurate and repeatable positioning of the airfoil element or vane cluster upon the classification gauge. These features are described in greater detail below.

It is initially important to note that the selection of approximately 102 contact points is also arbitrary in terms of the present invention. As will be made apparent from the following description of a conventional vane cluster, it will be seen that each airfoil element has a trailing edge and a convex surface adapted for arrangement opposite a trailing edge of an adjacent airfoil element. The adjacent airfoil element may be placed in such arrangement either within the single vane cluster or within a subsequent assembly or a relatively large number of individual airfoil elements or vane clusters. The effective open area for the two adjacent airfoil elements is then determined by the maximum width between the trailing edge of the one airfoil element and the opposed convex surface of the other airfoil element. It is of course necessary to also take the total length of the opening between the two airfoils into consideration in arriving at a determination of the effective open area.

Accordingly, it is particularly important within the present invention to provide a number of contact points along the trailing edge of each airfoil element as well as along its convex surface. Generally, a single contact point at either end of the respective airfoil element is sufficient to determine the effective length.

It may thus be seen that the present classification gauge involves a very large number of mechanical components in order to accurately position the 102 movable probes and to average their relative positions when engaged with respective surfaces of the airfoil element or vane cluster in order to provide a visual indication in the form of a classification number. Accordingly, the classification gauge of the present invention differs from the classification gauge in the above-noted U.S. Patent which was concerned at most with classification of a single guide vane.

The present classification gauge is primarily characterized in the provision of a platform for positioning the individual airfoil element or vane cluster with the movable probes then being brought into engagement with selected surface portions thereof. The mechanical averaging linkage for all of the movable probes serves to establish a setting upon an indicator for producing a visual indication in the form of the classification number noted above.

Constructional features of the present classification gauge are set forth below having initial reference to FIG. 1 wherein the classification gauge is generally indicated at 10 and is iillustrated as containing a vane cluster 12 to be classified. The structure of the vane cluster is first described in order to facilitate an understanding of the classification gauge. The vane cluster 12 comprises a plurality of guide vanes or separate airfoil elements indicated respectively at 14, 16 and 18. The vane cluster is also illustrated in greater detail in FIG. 4 and has a radial configuration suitable, for example, to facilitate mounting of the cluster in one stage of a turbojet engine.

Each of the individual guide vanes has a central section 20 which is shaped in the form of an airfoil, a hub mounting flange or lug 22 being attached to or integral with the guide vane and a rim mounting lug or flange 26 arranged at the tip of the guide vane. The hub and rim flanges for the individual guide vanes or airfoil elements may be integrally formed or combined together in order to form the vane cluster 12.

As indicated above, the present classification gauge 10 is particularly contemplated for determining classification of the vane cluster in accordance with the angular position of each airfoil element 14–18 relative to the mounting flanges 22. This, of course, corresponds with the subsequent position of the airfoil elements in one stage of a turbojet engine since they are mounted upon a hub portion (not shown) of the turbojet engine by means of the hub mounting flanges 22. Referring particularly to FIG. 4, the classification gauge of the present invention is particularly concerned with contacting a number of linearly aligned points along two surface portions of each airfoil element. In order to accurately measure the location of these surfaces, an arbitrary number of sixteen contact points is selected for each surface. The initial surface to be monitored is the trailing edge of each of the airfoil elements 14, 16 and 18 as indicated at 30. It is also important to accurately define a number of similar contact points along an additional surface of each airfoil element as is also discussed above. The additional contact points are taken along a convex surface as indicated at 32 for each of the guide vanes in the vane cluster of FIG. 4. The accurate determination of the location for these two surface portions of each guide vane may permit a subsequent determination of the open area provided by that guide vane in combination with an adjacent guide vane even though the two guide vanes may not be available in their adjacent arrangement at the time of classification. Referring particularly to FIG. 4, the convex surface 32 represents that portion of each guide vane, for example, that indicated at 18, which is closest to the trailing edge 30 for an adjacent guide vane, such as that indicated at 16. These values are taken together with two additional points selected to determine the effective length for each airfoil element in order to arrive at the classification numer which is the object of the present invention.

Figure 2:
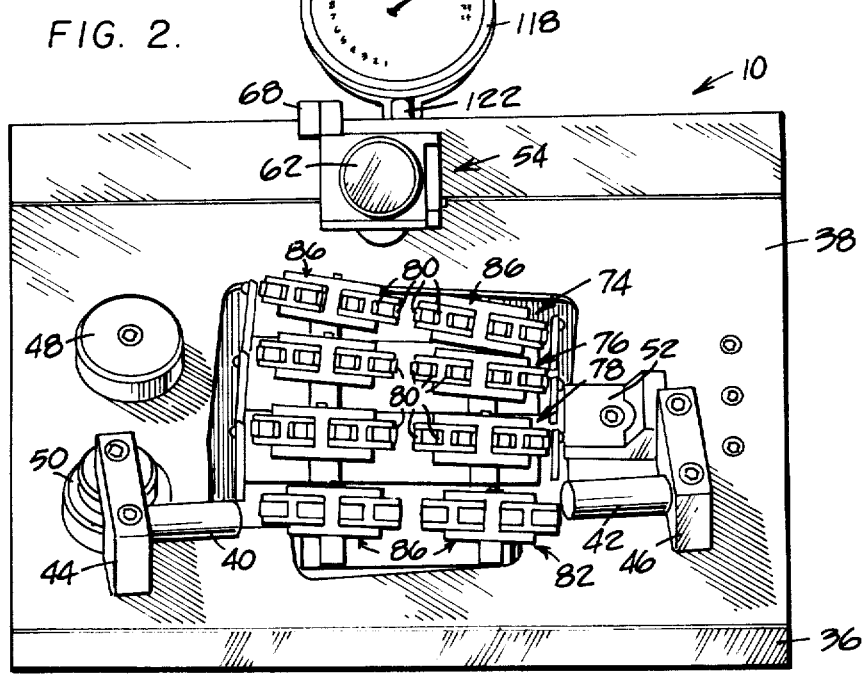
FIG. 2 is a front view, in elevation, of the classification gauge to particularly illustrate various sets of movable probes which engage selected surfaces of the vane cluster.
Figure 5:
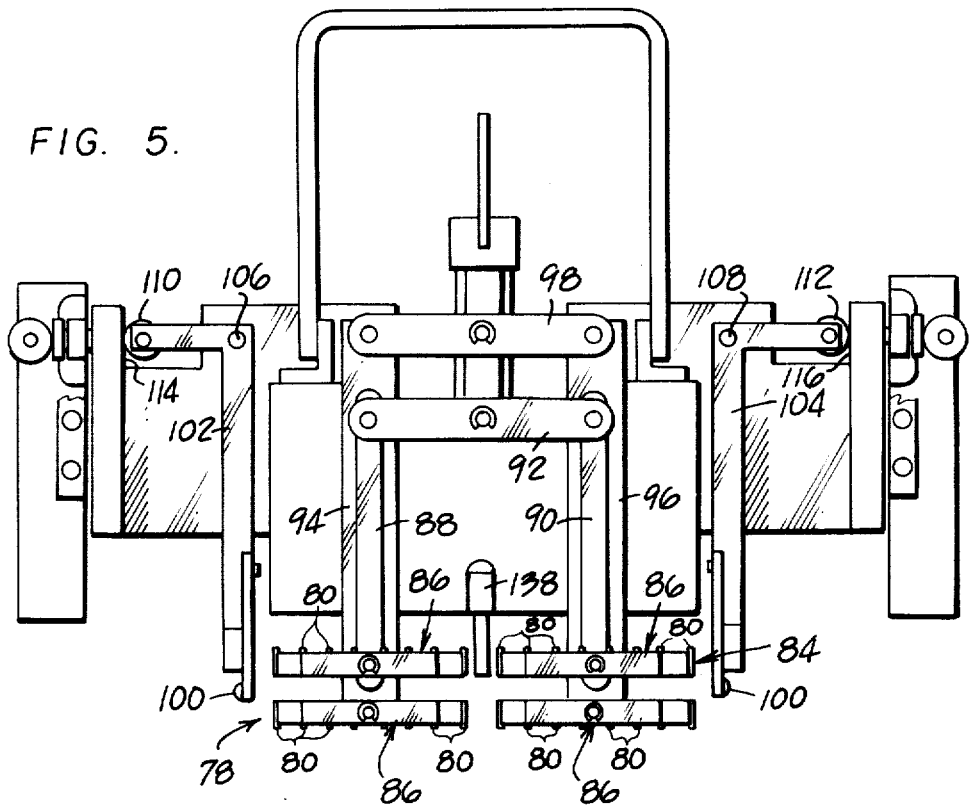
FIG. 5 is a fragmentary top view of the classification gauge illustrating the various movable probes which are engageable with each airfoil element of the vane cluster.
Figure 6:
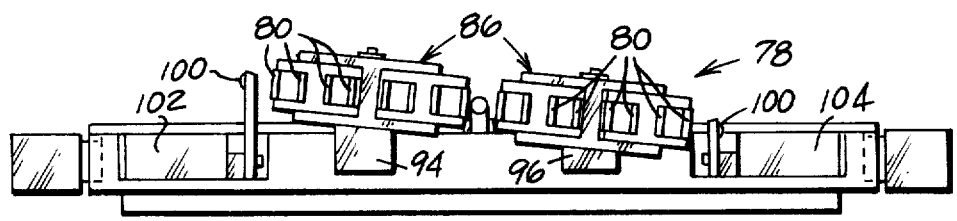
FIG. 6 is a front view of the fragmentary portion of the classification gauge of FIG. 5 to more clearly illustrate one linear set of movable probes for contact with a convex surface of one airfoil element.

Referring now to FIGS. 2 and 3, the classification gauge 10 includes a fabricated housing 34 arranged upon a base 36 with internal construction of the gauge being best illustrated by FIGS. 3, 5 and 6. A face plate 38 is arranged upon the classification gauge housing 34 to receive a number of components described below for positioning the vane cluster 12 and monitoring the plurality of contact points for each of the guide vanes or airfoil elements 14, 16 and 18.

Referring again to FIGS. 2 and 3, the vane cluster 12 is accurately positioned in fixed arrangement upon the classification gauge by a precision jig means including a platform adapted to contact the vane cluster in three points to determine a planar arrangement for the vane cluster while also contacting a lateral edge of the vane cluster in order to accurately and repeatably position each vane cluster upon the classification gauge. The mounting platform for the classification gauge includes two stop rods 40 and 42 supported by brackets 44 and 46 for abutting engagement with the rim mounting flange 26 and the hub mounting flange 22 respectively of the vane cluster (also see FIG. 1). The platform also includes three support discs or members which are arranged upon the face plate 38 in order to precisely support the vane cluster 12. These support discs or members are indicated respectively at 48, 50 and 52. Two of the support discs, both indicated at 48 and 50, provide an outer portion of the platform for supportingly engaging the rim mounting flange 26. The other member 52 provides an inner portion of the platform for supportingly engaging one of the hub mounting flanges 22.

The vane cluster 12 is maintained in intimate engagement with the stop rods 40 and 42 as well as the support members 48, 50 and 52 by means of a manually operable clamping mechanism indicated at 54. Referring particularly to FIGS. 1 and 3, the manual clamping mechanism includes a lower clamping lever 56 which is pivotably mounted relative to the face plate 38 by means of a bracket 58. The lower clamping lever 56 has as its outer end a clamping pad 60 arranged to engage a leading edge of the guide vane 14 (illustrated in dotted outline in FIG. 3) and thereby urge the entire vane cluster 12 against the stop rods 40 and 42 and onto the support members 48, 50 and 52. Manual operation of the clamping mechanism is accomplished through a manual control lever 62 which is also pivotably supported upon the bracket 58 by an upper clamping lever 64. The lower and upper clamping levers 56 and 64 are effectively interconnected by means of a U-shaped spring 66 so that the clamping pad 60 on the lower clamping lever tends to be resiliently urged downwardly as downward force is applied to the manual control lever 62. The vane cluster 12 is thus firmly urged against the various stops described above without excessive force being applied which might tend to dislocate or otherwise damage a portion of the classification gauge or the vane cluster. On the other hand, when the control lever 58 is raised, the gauging pressure is automatically removed from the all the elements to facilitate placement of the vane cluster on the gauge.

The clamping mechanism 54 serves an additional function of insuring that intimate contact is made with all of the various surfaces on each guide vane. For this purpose, the lower clamping lever 56 is pivotably connected at 68 with a linkage 70 connected at its opposite end to a spreader member 72. The spreader member 72 merely serves to resiliently engage the movable contacts or probes as described in greater detail below and urge them into intimate contact with the respective surfaces of the airfoil element or vane cluster in order to assure accurate and repeatable results.

It is, of course, essential that the vane cluster 12 be repeatably located upon the platform of the classification gauge in very precisely controlled fashion. Accordingly, the support discs or members 48, 50 and 52 are formed as carbide buttons in order to resist wear. Similarly, the stop bars 40 and 42 may also be formed from carbide material for the same purpose.

As indicated above, the large number of movable contacts for the present classification gauge together with the averaging linkages mechanically interconnecting those movable contacts or probes with a visual indicator naturally entail a very large number of components within the gauge. The drawings have therefor been simplified in an attempt to clearly indicate the arrangement of the movable probes and the construction of the interconnecting or averaging linkages while deleting repetitive elements for the purpose of simplicity. It is believed that the arrangement and construction for the various sets of movable probes may be best seen by combines reference to FIGS. 2, 3, 5 and 6. At this point, it is again noted that the vane cluster 12 includes three airfoil elements 14, 16 and 18. Accordingly, three linear sets of movable probes are indicated respectively at 74, 76 and 78 (see FIG. 2 in particular) for respective engagement with the convex surfaces 32 upon the respective airfoil elements 14, 16 and 18. Each of the sets 74, 76 and 78 includes sixteen movable probes, each indicated at 80, in order to assure intimate and accurate engagement along the entire convex surface of each airfoil element.

Three additional sets of movable probes are also arranged for engagement with the trailing edges 30 of the respective airfoil elements 14, 16, and 18 (see FIG. 4). One of the additional three sets of movable probes is indicated at 82 in FIG. 2. These additional sets of probes similarly each include sixteen movable probes 80 for intimate contact along the entire trailing edge of each airfoil element.

The movable probes are not visible in the view of FIG. 2 since they face in the opposite direction from the probes for the sets 74, 76 and 78. The probes 80 for one of the additional three sets of probes may be seen best in FIG. 5. The lower set of additional probes as indicated at 82 in FIG. 2 is also visible in FIG. 3 along with the uppermost set of probes 74. Referring momentarily to FIG. 3, it will be apparent that the two additional aligned sets of oppositely facing probes are evenly spaced between the probes sets 74 and 82. The lower additional set of oppositely facing probes is illustrated in FIG. 5 together with additional movable probes for contacting end surfaces of each vane cluster in order to determine the length of the individual airfoil elements or guide vanes. Referring to FIGS. 5 and 2 together, it may be seen that the one set of probes facing downwardly, as seen in FIG. 5, corresponds with the set of probes also indicated at 78 in FIG. 2. An oppositely facing set of probes is indicated at 84 in FIG. 5. Having momentary reference to FIG. 4, it will be apparent that the set of probes indicated at 78 is arranged to engage the convex surface 32 of the guide vane 18 while the oppositely facing set of probes 84 is arranged to contact the trailing edge 30 of the adjacent guide vanes 16.

Each of the six linearly arranged sets of probes includes two banks of eight movable probes 80 supported by separate mechanical averaging linkages 86, the construction and arrangement of which were described in detail within the above-noted prior patent.

For purposes of simplicity, the first three sets of probes indicated respectively at 74, 76 and 78 are referred to as outwardly facing probe sets while the additional three sets of probes such as that indicated at 82 in FIG. 2 are referred to as inwardly facing probe sets. This terminology is believed to be self apparent from a comparison of FIGS. 2, 3, and 5. The outwardly facing probes engage the convex surfaces 32 of the respective guide vanes while the inwardly facing probes contact the trailing edges 30 of the same three guide vanes.

Referring again particularly to FIG. 5, each of the inwardly facing sets of probes, such as that indicated at 84 has its mechanical averaging linkages 86 connected to pull arms 88 and 90. The pull arms 88 and 90 are in turn pivotally connected to a tie link indicated at 92.

Similarly, each set of outwardly facing probes such as that indicated at 78 has its mechanical averaging linkages 86 respectively connected to push arms 94 and 96 which are also pivotably interconnected by means of a tie link 98.

An additional set of two movable probes or contacts 100 are mounted upon bellcrank members 102 and 104 which are pivotably connected at 106 and 108 to lateral extensions of the push arms 94 and 96. The opposite ends of the bellcranks 102 and 104 carry rollers 110 and 112 which tend to remain in engagement with respective bearing surfaces 114 and 116. In this manner, the set of outwardly facing probes indicated at 78 functions in combination with the two movable probes 100 in order to provide a single averaged value indicative of the position for the convex surface 32 of the guide vane 18 as well as the effective length at least for the guide vane 18. Similar combined arrangements are of course provided for each of the other guide vanes 14 and 16.

At this point, it is again noted that the total of 102 contact points within the present classification gauge is not to be considered limiting. For example, possibly only a single set of movable probes as indicated at 100 would be necessary in order to determine the effective length of all three guide vanes 14, 16 and 18. In addition, it is thus apparent that the averaging linkages described herein are not necessarily designed to provide equal averaging for the various probe but may also be weighted depending upon the design of the vane assembly to be classified and the preferred configuration of the classification gauge.

The movable probes 80 and 100 illustrated in FIG. 5 are of course representative of a portion of the gauge adapted to classify a single airfoil element such as one of the guide vanes 14, 16 or 18. Thus further indicates versatility for the present classification gauge.

With the vane cluster being supported in a fixed angular position upon the classification gauge, the information determined by the position of the 96 movable contacts 80 and the additional six contacts 100 is transformed into a classification number correlating to the particular vane cluster being classified. For this purpose, a dial or indicator 118 is mounted upon the classification gauge to provide a visual indication of the average information described immediately above. The indicator 118, which measures the total integrated composite of all the preceeding measurements or readings, is mounted upon the classification gauge 10 by means of indicator pull lever 120, the purpose of which is described below. A movable indicator arm 122 on the indicator 118, is arranged in contact with an indicator push lever 124 which is movable upwardly to produce an increasing dial reading upon the indicator. The pull lever 120 is pivotable in a counterclockwise direction, as viewed in FIG. 3, for example, to pivot the indicator 118 downwardly and also produce an increasing dial reading.

The indicator push lever 124 is connected at 126 to three averaging links 128, 130 and 132 which are connected at their opposite ends to the respective yokes as generally indicated at 96 in FIG. 3. Through this arrangement, the indicator push arm 122 is urged upwardly in selected proportion to the position of all of the individual outwardly facing probes 80 (see the probe sets 74, 76, and 78 in FIG. 2) as determined by the engagement of their movable probes 80 with the convex surfaces 32 on the individual vanes.

The inwardly facing sets of movable probes are similarly coupled through averaging pull links 134 and 136 with a pull yoke 138. The pull yoke 138 is coupled by means of a link 140 with the indicator pull lever 120.

In this manner, all of the information determined by the position of the 102 movable probes indicated at 80 and 100 is combined to provide a single repeatable reading upon the gauge or indicator.

As with the indicator for the prior patent noted above, the classification index for the indicator 118 may be purely arbitrary as long as it accurately and repeatably indicates the degree of variation for various different vane clusters such as that indicated at 12.

In operation, the vane cluster is arranged upon the classification gauge in the manner illustrated in FIG. 1. The clamping mechanism then urges the vane cluster into a precisely determined position upon the platform provided by the various stops or members 48, 50 and 52 as well as the stop rods 40 and 42. The one hundred and two movable probes indicated at 80 and 100 serve to produce a proportional reading upon the indicator 118 through the respective mechanical averaging interconnections and the other components described above and best illustrated in FIGS. 3 and 5.

All the contact points 80 and 100 have shapes providing accurate measurements for acceptable as well as distorted elements of the guide vanes. A standard reading for any selected classification in such a vane cluster may be established, for example, by a calibrating device which corresponds with the vane cluster 12 itself. On the other hand, it would also be possible to employ a calibration block of the type referred to in the prior patent noted above. Such a calibration block (not shown here) may comprise a standardized structure to locate all of the necessary contact points (102 such points as described above) in order to provide a classification number corresponding to the total effective throat area for the vane cluster.

The foregoing detailed description, which sets forth various constructional and operational details for purposes of understanding only, is not to be taken as limiting the scope of the present invention which is defined only by the following appended claims.

I claim:

1. A classification gauge for a vane cluster including an integral or composite assembly of airfoil elements and combined mounting flange means for the airfoil elements, comprising support means, a precision jig in said support means adapted to receive the vane cluster, the precision jig including stop means for engaging the mounting flange means in order to angularly position said vane cluster in a predetermined plane on the precision jig, plural sets of movable probes, each set of movable probes being arranged for engagement along an associated one of the airfoil elements to determine its angular position and effective length, each set of movable probes being supported by a separate averaging mechanism mounted on said support means and providing an output related to said angular position and effective length, indicating means carried by said support means to visually indicate the throat area classification for said vane cluster, and linkage means interconnecting the averaging mechanism for each set of movable probes with said indicating means wherein said linkage means causes said indicating means to register the throat area classification depending upon the effective length and angular position for each of the airfoil elements.

2. The classification gauge of claim 1 wherein the plural sets of movable probes include probes intimately contacting a trailing edge of each airfoil element and an additional surface of each airfoil element arranged opposite the trailing edge of an adjacent airfoil element as well as end surfaces of the vane cluster which are representative of the effective length for the airfoil elements.

3. The classification gauge of claim 2 wherein each set of movable probes comprises a plurality of hardened contacts.

4. The classification gauge of claim 1 wherein the stop means for the precision jig include hardened support discs for supporting the vane cluster upon a predetermined plane relative to said support means and additional stop means for engaging one lateral edge of the vane cluster.

5. The classification gauge of claim 4 further comprising a clamping mechanism mounted on said support means for resiliently urging the vane cluster into intimate contact with the stop means of the precision jig.

6. The classification gauge of claim 1 further comprising a clamping mechanism mounted on said support means for resiliently urging the vane cluster into intimate contact with the stop means of the precision jig and for urging the movable probes into precise contact with the airfoil elements.

7. The classification gauge of claim 1 wherein each set of movable probes comprises a plurality of hardened contacts.

8. A classification gauge for a vane cluster including an integral or composite assembly of airfoil elements and combined mounting flange means for the airfoil elements, comprising support means, a precision jig in said support means adapted to receive the vane cluster, the precision jig including stop means for engaging the mounting flange means in order to accurately position the vane cluster in a predetermined plane on the precision jig, movable contact means arranged upon the classification gauge for contact with each respective airfoil element, indicating means to visually provide a throat area classification, and linkage means providing an averaging connection between the output of the plurality of movable contact means and said indicating means, said linkage means and averaging connection causing said indicating means to register a throat area classification depending upon the angular position and effective length of the airfoil elements within the vane cluster.

9. The classification gauge of claim 8 wherein the movable contact means comprises a plurality of probes for intimately contacting a trailing edge of each airfoil element and an additional convex surface of each airfoil element arranged opposite the trailing edge of an adjacent airfoil element as well as end surfaces of the vane cluster which are representative of the effective length for the airfoil elements.

10. The classification gauge of claim 9 further comprising a clamping mechanism mounted on said support means for resiliently urging the vane cluster into intimate contact with the stop means of the precision jig.

11. The classification gauge of claim 8 further comprising a clamping mechanism mounted on said support means for resiliently urging the vane cluster into intimate contact with the stop means of the precision jig and for urging the movable probes into precise contact with surfaces of the vane cluster.

12. A classification gauge for an airfoil element having a trailing edge, a convex surface adapted for arrangement in opposition to a trailing edge of an adjacent airfoil element to form an open throat area, rim and hub mounting flanges by which the airfoil element may be arranged adjacent additional similar airfoil elements, the classification gauge integrating a plurality of dimensions for said airfoil structure into a single classification reading, comprising support means, a precision jig in said support means including platform means for engaging the airfoil structure flanges at a plurality of points in order to accurately position the airfoil structure in a fixed position with respect to said precision jig, a plurality of movable probes arranged to intimately contact multiple points along the trailing edge of the airfoil element, multiple points along the convex surface of the airfoil elements as well as said rim and hub mounting flanges which are representative of its effective length, indicating means carried by said support means to visually provide a classification number for the airfoil element, and linkage means mounted on said support means for movably supporting said contact means and providing an averaging mechanism for interconnecting each of the movable contact means with the indicating means, the linkage means causing the indicating means to register a classification value depending upon the angular position of the airfoil elements relative to the platform on the precision jig and also depending upon the effective length of the airfoil element.

13. The classification gauge of claim 12 wherein each of the movable contact means comprises a hardened contact point and further comprising a clamping mechanism mounted on said support means for resiliently urging the vane cluster into intimate contact with the platform of the precision jig.

14. The classification gauge of claim 13 wherein the platform of the precision jig comprises a plurality of hardened support discs arranged to support the airfoil element on a fixed position upon the precision jig.

15. The classification gauge of claim 12 further comprising a clamping mechanism mounted on said support means for resiliently urging the airfoil element into intimate contact with the platform of the precision jig and also for urging the movable contact means into precise contact with respective surfaces of the airfoil element.

* * * * *